United States Patent
Hill

(10) Patent No.: US 9,457,726 B1
(45) Date of Patent: Oct. 4, 2016

(54) TRAILER STORAGE BOX

(71) Applicant: Steven Hill, Fort St. John (CA)

(72) Inventor: Steven Hill, Fort St. John (CA)

( * ) Notice: Subject to any disclaimer, the term of this patent is extended or adjusted under 35 U.S.C. 154(b) by 0 days.

(21) Appl. No.: 14/806,628

(22) Filed: Jul. 22, 2015

(51) Int. Cl.
*B60R 9/00* (2006.01)
*B60R 11/00* (2006.01)

(52) U.S. Cl.
CPC ............ *B60R 9/00* (2013.01); *B60R 2011/004* (2013.01); *B60R 2011/005* (2013.01)

(58) Field of Classification Search
CPC .... B60R 9/00; B62D 25/2054; B62D 43/002
USPC ............. 296/24.45, 37.6; 224/403, 404, 405, 224/538
See application file for complete search history.

(56) References Cited

U.S. PATENT DOCUMENTS

| | | | |
|---|---|---|---|
| 3,240,408 A | | 3/1966 | Lapansie |
| 4,772,063 A | * | 9/1988 | Amy .................... B66F 9/07563 224/401 |
| 4,948,169 A | | 8/1990 | Amundson |
| 5,125,710 A | * | 6/1992 | Gianelo ..................... B60R 9/02 224/281 |
| 5,310,303 A | * | 5/1994 | Betts ....................... B62D 27/06 224/538 |
| 6,652,003 B2 | | 11/2003 | Most et al. |
| 7,780,224 B2 | | 8/2010 | Roush |

FOREIGN PATENT DOCUMENTS

JP 05338561 A * 12/1993

OTHER PUBLICATIONS

English translation of JP 05-338561; retreived May 31, 2016 from the Japan Platform for Ptent Information located at https://www.j-platpat.inpit.go.jp/web/all/top/BTmTopEnglishPage.*
Glass Essential; as existed on Mar. 4, 2015; retreived via the Internet Archive Wayback Machine; located at http://web.archive.org/web/20150304091507/http://www.glassessential.com/welded-wire-mesh/.*

* cited by examiner

*Primary Examiner* — Jason S Daniels
(74) *Attorney, Agent, or Firm* — McQIPLaw; Jeffrey McQuiston

(57) ABSTRACT

A trailer box, comprising: a front wall, a back wall, a bottom wall, a top wall interconnected at 90 degree angles with a tubular metal frame comprising a plurality of structurally interconnected frame sections to form a hollow inner rectangular or trapezoidal portion and with opposed end portions comprising one or two hinged openings, wherein the plurality of structurally interconnected frame sections comprise four long horizontal frame sections, at least four vertical frame sections, and at least four horizontal frame sections providing a rectangular or trapezoidal frame, wherein the plurality of structurally interconnected frame sections comprise a metal selected from the group consisting of steel and aluminum, and wherein the trailer box is mounted on an underside of the trailer to provide storage for hauling 4×4 posts and/or dunnage.

18 Claims, 4 Drawing Sheets

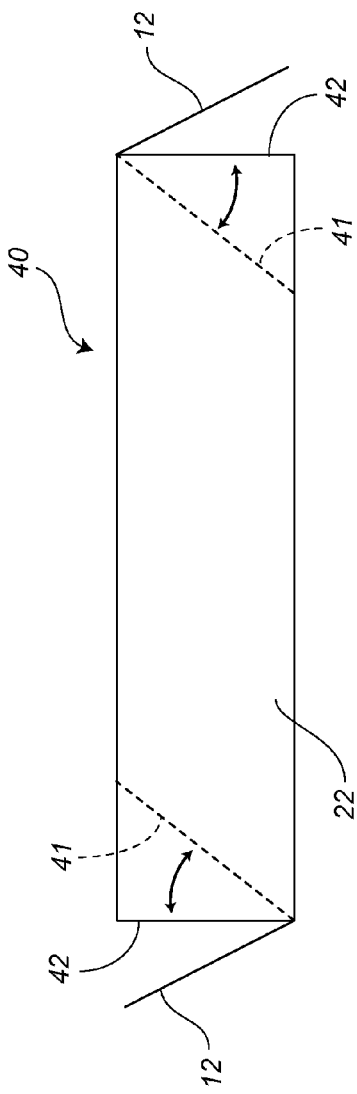
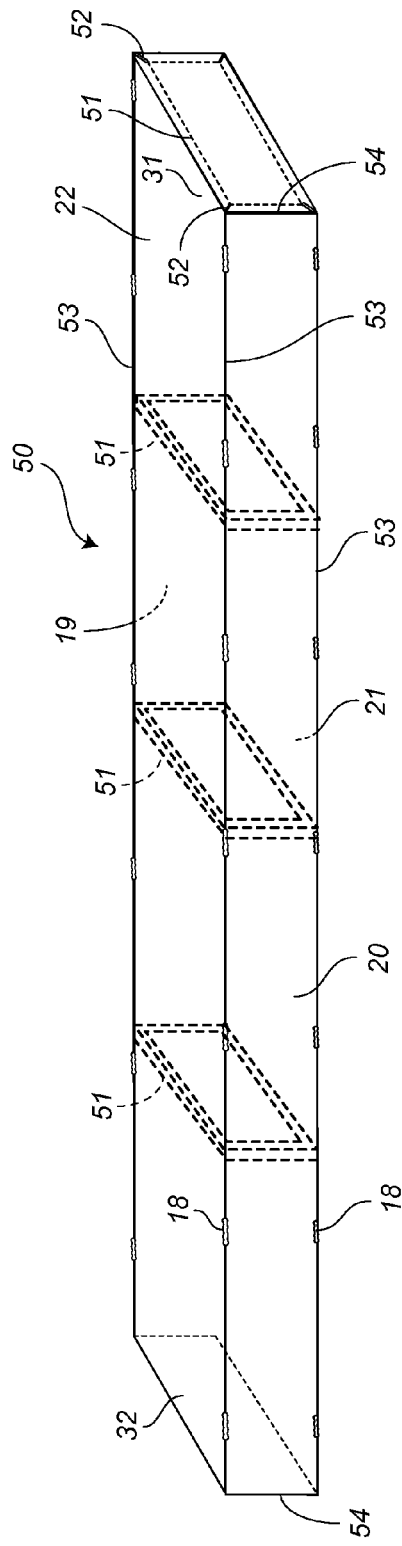

TRAILER STORAGE BOX

FIELD OF THE INVENTION

The present disclosure is in the field of a trailer storage box, and more particularly a trailer storage box attached to the underside of a trailer with the necessary clearance.

BACKGROUND OF THE DISCLOSURE

Flatbed or commercial trailers haul a variety of accessories to secure and protect a load, for example, side kits, cargo straps, tie down chains and 4×4's and/or dunnage. Typically, hauling the 4×4 posts and/or dunnage is performed with bungee cords, straps or similar means with no load rating to secure these items. Not surprisingly, this method does not meet government cargo securement rules under the Federal Motor Carrier Safety Administration (FMC SA).

Flatbed trailers are used for extended journeys while moving cargo and/or equipment and available storage space is critical. Manufactures have attempted to maximize additional storage space, but with the presence of the chassis, dollies, etc., the space on the underside of a trailer is limited and in some instances extremely limited. Therefore, there is a need for an approved method of hauling accessories, such as 4×4 posts and/or dunnage on the underside of flatbed and/or commercial trailers.

SUMMARY OF THE INVENTION

A trailer box, comprising: a front wall, a back wall, a bottom wall, a top wall interconnected at 90 degree angles with a tubular metal frame comprising a plurality of structurally interconnected frame sections to form a hollow inner rectangular or trapezoidal portion and with opposed end portions comprising one or two hinged openings, wherein the plurality of structurally interconnected frame sections comprise four long horizontal frame sections, at least four vertical frame sections, and at least four horizontal frame sections providing a rectangular or trapezoidal frame, wherein the plurality of structurally interconnected frame sections comprise a metal selected from the group consisting of steel and aluminum, and wherein the trailer box is mounted on an underside of the trailer to provide storage for hauling 4×4 posts and/or dunnage.

BRIEF DESCRIPTION OF THE DRAWINGS

FIG. 3A is an illustration of a top view of the trailer box as being either a trapezoid or rectangular shape.

FIG. 3B is an illustration of an inner view of the trailer box frame portions.

DETAILED DESCRIPTION OF THE EMBODIMENTS

The following is a detailed description of certain specific embodiments of the trailer box is disclosed herein. In this description reference is made to the drawings.

DEFINITIONS

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

INTRODUCTION

In one aspect, disclosed herein is a trailer box, comprising: a front wall, a back wall, a bottom wall, a top wall interconnected at 90 degree angles with a tubular metal frame comprising a plurality of structurally interconnected frame sections to form a hollow inner rectangular or trapezoidal portion and with opposed end portions comprising one or two hinged openings, wherein the plurality of structurally interconnected frame sections comprise four long horizontal frame sections, at least four vertical frame sections, and at least four horizontal frame sections providing a rectangular or trapezoidal frame, wherein the plurality of structurally interconnected frame sections comprise a metal selected from the group consisting of steel and aluminum, and wherein the trailer box is mounted on an underside of the trailer to provide storage for hauling 4×4 posts and/or dunnage, wherein the back wall is a sheet of expanded metal and the bottom wall is a sheet of expanded metal or wherein the front wall, the back wall, the bottom wall and the top wall are each a solid metal sheet. In some embodiments, the top wall is a sheet of solid metal. In some embodiments, the front wall is a sheet of solid metal. In another aspect, disclosed herein is a method of hauling 4×4 posts and/or dunnage with the trailer box disclosed herein.

Figure 1:
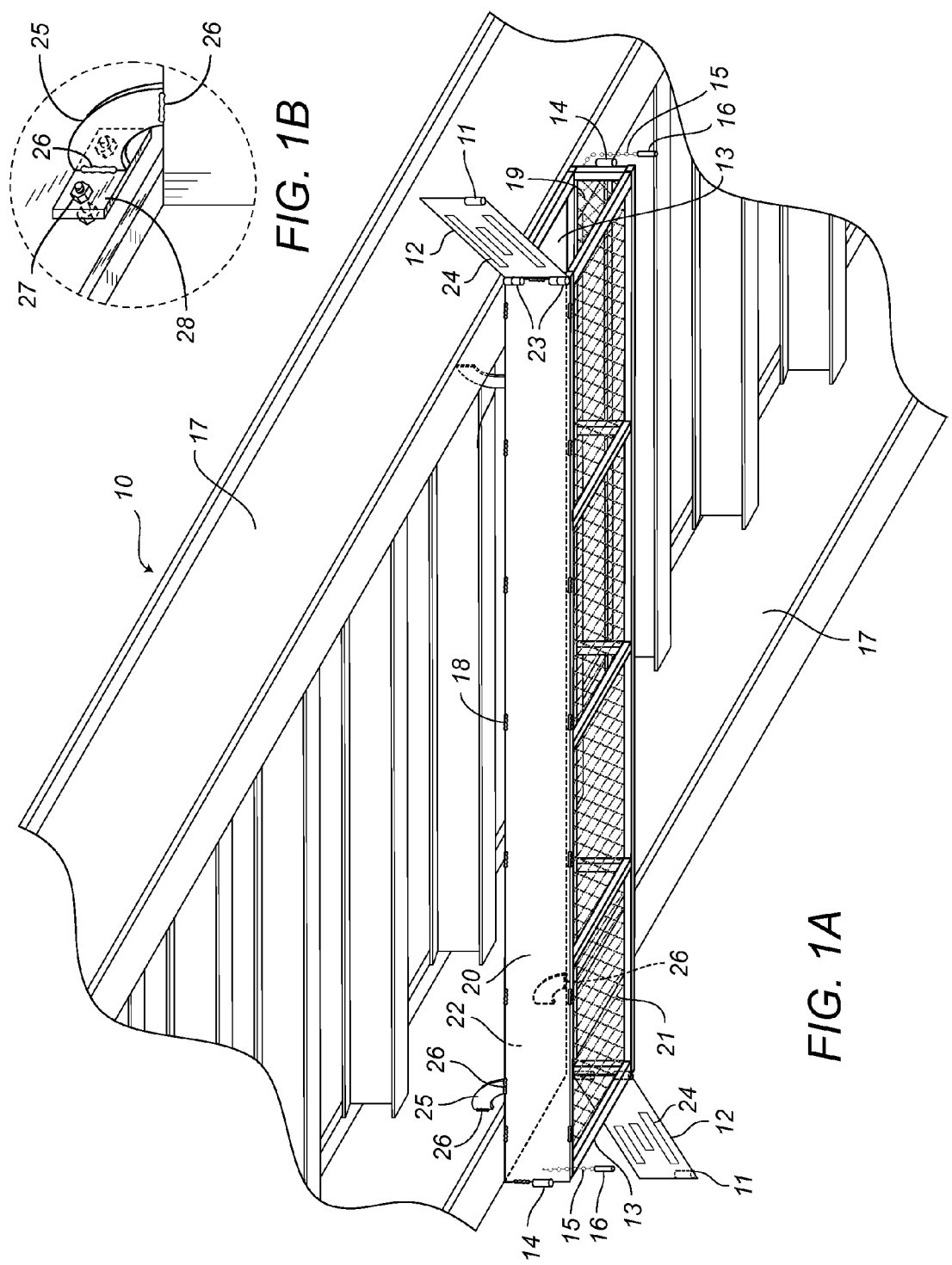
FIG. 1A is an illustration of a side view of a trailer box mounted on the underside of a trailer with hinged openings.
FIG. 1B is an illustration of a side view of a metal plate welded and/or bolted to the trailer box and the trailer's frame.
Figure 2:
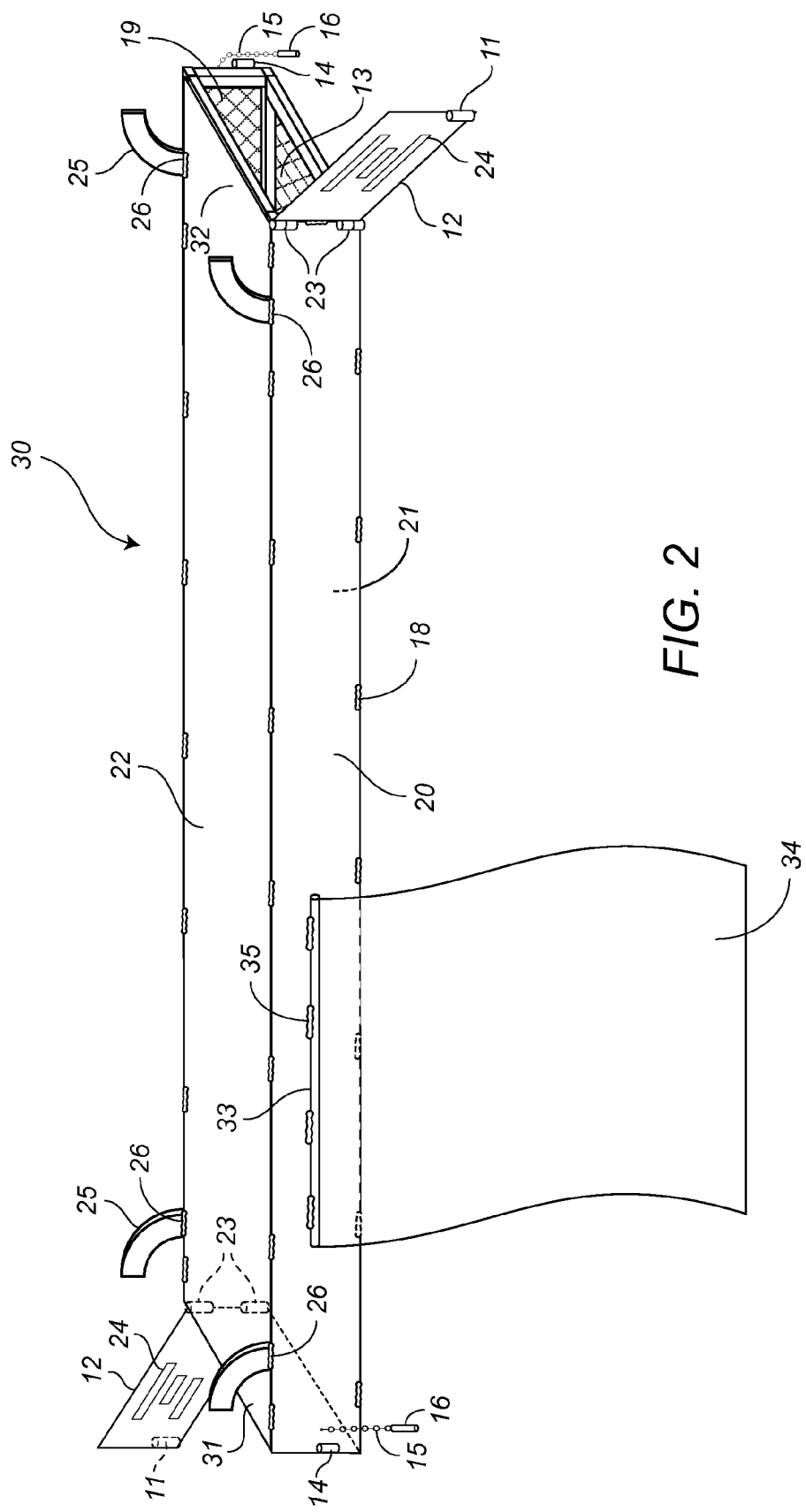
FIG. 2 is an illustration of a side view of the trailer box with two hinged openings.

Referring initially to FIG. 1A, a trailer box 10 is schematically depicted as mounted to the underside of a trailer's long frame members 17. The trailer box 10 comprises a front wall 20, a back wall 19, a bottom wall 21, a top wall 22, opposed end portions comprising hinged openings 12 mounted to the back wall 19 by hinges 23. Alternatively, the hinged openings 12 may be mounted to the front wall 20 by hinges 23. The front wall 20, back wall 19, bottom wall 21, top wall 22, are interconnected to form a hollow inner rectangular portion or trapezoidal portion 13. It should be understood that the particular configuration of the trailer box 10 shown in FIG. 1A is intended for purposes of illustration only, and other variations of the trailer box could be employed within the scope of this disclosure.

Flatbed trailers are used for extended journeys and many times weather is an issue, particularly ice and snow. In some aspects, the trailer box disclosed herein is outfitted with expanded metal walls to keep the 4×4 inch posts and/or dunnage free of accumulated ice and snow after their use. In some embodiments, the back wall 19 is a sheet of expanded metal. In some embodiments, the bottom wall 21 is a sheet of expanded metal. In some embodiments, the top wall 22 is a sheet of solid metal. In some embodiments, the front wall 20 is a sheet of solid metal. In some embodiments, the frame sections, front wall 20, back wall 19, bottom wall 21, and the top wall 22 are constructed from steel or aluminum. In some embodiments, the trailer box may be constructed from a suitable metal such as steel and/or aluminum which is cut or punched and then undergoes a series of welding operations to assume the shape shown in the figures herein.

The trailer box disclosed herein may be customized with different metal walls to meet the needs of the accessory being hauled and the type of trailer employed. In some embodiments, the front wall 20 is fabricated from a ⅛" thick metal sheet or another suitably sized metal sheet. In some embodiments, the hinged openings 12 are fabricated from a ⅛" thick metal sheet or another suitably sized metal sheet. In some embodiments, the top wall 22 is fabricated from a 1/16" thick metal sheet or another suitably sized metal sheet. In some embodiments, the back wall 19 and bottom wall 21 are fabricated from a 1" or ¾" expanded metal sheets or another suitably sized expanded metal sheet. In some embodiments, the front wall 20, the back wall 19, the bottom wall 21 and the top wall 22 are each a solid metal sheet.

As illustrated with FIGS. 1A, 2, 3A and 3B, the hinged openings 12 mounted with hinges 23 may be safely closed with a fastener to prevent accidental opening and release of the 4×4 posts and/or dunnage or other hauling accessories being hauled. In some embodiments, the one or two hinged openings 12 on opposed ends 31 and 32 open with at least one hinge 23 welded to a vertical frame section 54 supporting an edge of the front wall 20 or back wall 19. In some embodiments, the one or two hinged openings on opposed ends open with at least one hinge mounted to a vertical frame section 54. In some embodiments, the one or two hinged openings 12 comprise a rectangular metal frame covered with a sheet of solid metal sized to cover the opposed end portions 31 and 32 and is secured when closed with a fastener. In some embodiments, the trailer box further comprises that the one or two hinged openings are/is secured when closed and secured with a fastener comprising at least one clasp, at least one sliding bolt, at least one strap or at least one nut and bolt. In some embodiments, the trailer box further comprises that the one or two hinged openings are/is secured when closed with a fastener comprising a pin 16 attached to the trailer box via a chain 15 or similar means, and adjoining sleeves 11 and 14 on the hinged opening 12 and the vertical frame section 54 opposite the hinge 23. In some embodiments, the sheet of solid metal of the one or two hinged openings 12 further comprises cut outs and/or slits 24 for viewing the contents of the trailer box. In some embodiments, the trailer box further comprises at least one metal frame support 33 mounted to the front wall 20 and/or a front wall frame sections 51 and/or 53 and/or 54 capable of interconnecting with and supporting at least one mud flap 34.

The trailer box as illustrated with FIG. 3A, depicts that opposed end portions 41 and 42 may be at between about 90 degrees to 45 degrees to afford a rectangular or trapezoidal shaped trailer box. The trailer box that may be mounted to the underside of the trailer at different angles relative to the long frame rails 17 of the trailer to accommodate trailer boxes of a variety of lengths with trailers of different widths without the hinged openings 12 or other portions of the trailer box protruding beyond the sides of the trailer. The opposed end portions 41 form a rectangular shaped trailer box and opposed end portions 42 form a trapezoidal shaped trailer box. In some embodiments, the size of the trailer box customized to fit a number of flatbed and commercial trailers including, Aspen Trailers, Peerless Gerrys, Edmonton Trailers, picker trailers, etc. In some embodiments, the trailer box has length of about 9 feet, a height of about 4 inches to 12 inches and a width of about 12 inches to 48 inches. Depending on the width of the trailer and the length of the 4×4 posts and/or dunnage the trailer box may a trapezoid shape and mounted at an angle with the hinged openings 12 being about parallel to the long frame rails 17 of the trailer. In some embodiments, the trailer has a width of between about 8'6" wide and 9' wide. In some embodiments, the trailer box is mounted to the underside of a trailer about perpendicular to at least one long frame rail 17 of the trailer, wherein the one or two hinged openings 12 being about parallel to the long frame rails 17 of the trailer. In some embodiments, the trailer box is rotated about its vertical axis and mounted at angle relative to long frame rails 17. In some embodiments, the trailer box is mounted to the underside of a trailer at between about 5 degrees to 45 degrees about the vertical axis of the trailer box relative to at least one long frame rail 17 of the trailer, wherein the trailer box is a trapezoid mounted with the one or two hinged openings 12 being about parallel to the long frame rails of the trailer.

The trailer box as depicted with FIG. 3B, comprises a front wall 20, a back wall 19, a bottom wall 21, a top wall 22 and opposed end portions 31 and 32. As illustrated in FIG. 3B, the trailer box is constructed with a plurality of frame sections, including at least four long horizontal frame sections 53, at least four vertical frame sections 54 and at least four horizontal frame sections 51 providing a rectangular or trapezoidal frame structurally connected with trailer box frame welds 52. The at least four vertical frame sections 54 and at least four horizontal frame sections 51 are structurally welded 52 at 90 degrees relative to each other to the at least four long horizontal frame sections 53, thereby providing the trailer box frame illustrated with FIG. 3B. In some embodiments, the frame sections are comprised of about 1.25"×1.25"×⅛" square tubing or about 1"×1"×⅛" square tubing or another suitably sized metal tubing. The front wall 20, back wall 19, bottom wall 21, top wall 22, are interconnected structurally to the frame sections with a plurality of welds 18. In some embodiments, the structurally interconnected frame sections are square or tubular metal structurally welded together.

In some embodiments, the top wall and/or frame is structurally connected to an underside of a frame of a trailer with at least one weld, at least one bolt and/or at least one metal strap 69 structurally connected to the trailer box and to the long frame rails 62 of the trailer with at least one weld 70, at least one weld 61 or at least one nut and bolt at each terminal end of the metal straps 69, respectively. In some aspects, the metal straps 69 are fabricated from about 2"×¼" flat steel bars as illustrated with FIG. 4 or another suitably sized steel bars. In some embodiments, the trailer box is structurally connected to an underside of a frame of a trailer with at least one'/2" or ¾" thick metal plate 25 or another suitably sized metal plate welded 26 to the trailer box and the trailer's long frame rails 17 as illustrated with FIGS. 1A and 1B. In some embodiments, metal plate 25 is welded 26 to second metal plate 28 of similar thickness and then bolted with nuts and bolts 27 to the trailer's long frame rails 17 as illustrated with FIG. 1B. In some embodiments, the frame sections are constructed from steel and/or aluminum.

There are a number of variations of trailers that the trailer box of the present disclosure can be employed. For example, picker trailers are widely used, but the mounting position of the trailer box may be adjusted due to the position and size of the trailer's frame and chassis. In some embodiments, the trailer box is mounted to the underside of a trailer parallel to a long frame rail 62 of the trailer, wherein the one or two hinged openings 66 being about perpendicular to the long frame rails 62 of the trailer. Moreover, with an alternate mounting position as depicted with FIG. 4, the front wall 64, back wall 71, bottom wall 65, top wall 63, may be solid metal sheets. In some embodiments, the front wall 64, back wall 71, bottom wall 65, top wall 63 are ⅛" thick metal sheets or other suitably sized metal sheets welded to the frame sections.

Figure 4:
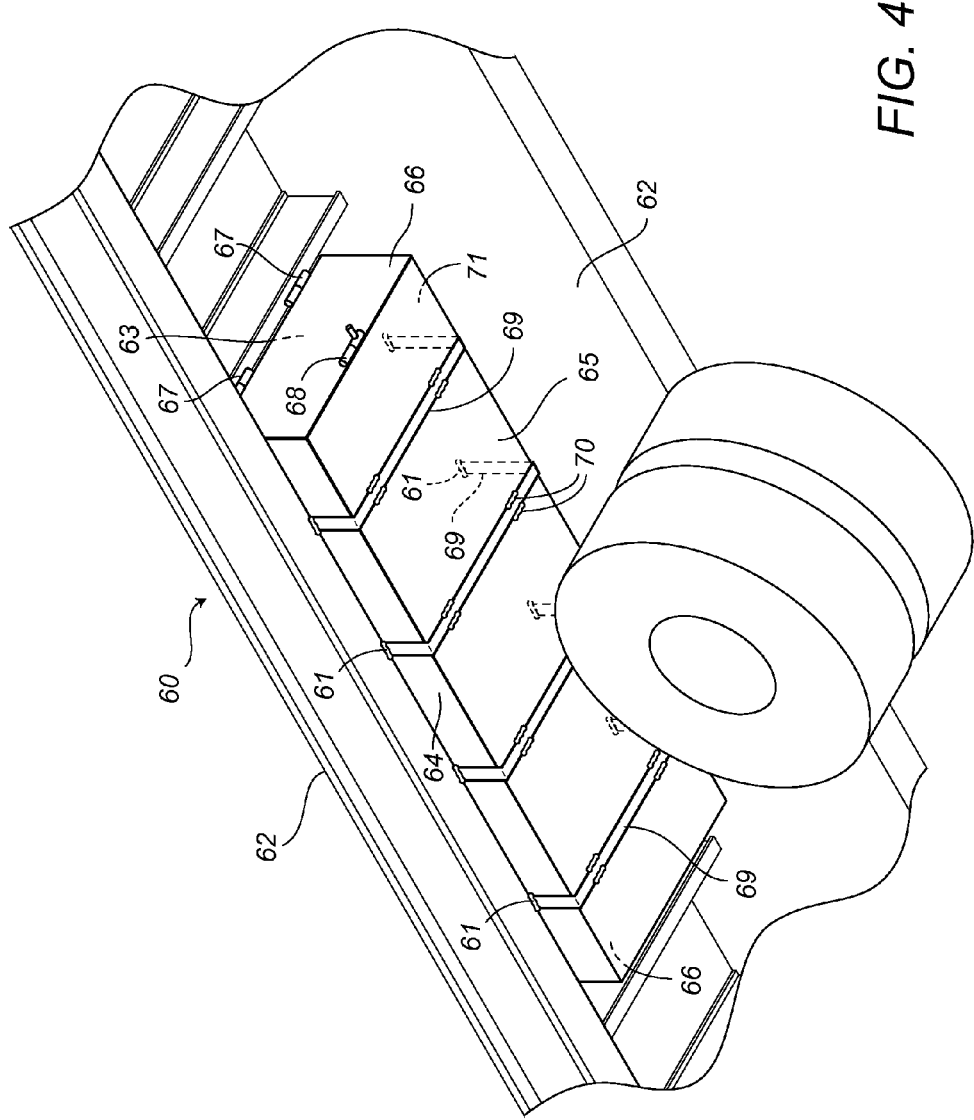
FIG. 4 is an illustration of a side view of the trailer box mounted on the underside of a trailer with a hinged opening facing to the rear and/or front of the trailer.

Referring to FIGS. 3B and 4, the trailer box 60 is schematically depicted as being mounted to the underside frame sections 62 of a trailer, which comprises opposed end portions comprising one or more hinged openings 66 mounted to the top wall 63 with hinges 67 welded to a horizontal frame section. In some embodiments, the one or two hinged openings on opposed ends open with at least one hinge mounted to a horizontal frame section. In some embodiments, the trailer box further comprises that the one or two hinged openings 66 are/is secured when closed with a fastener 68 comprising at least one clasp, at least one sliding bolt, at least one strap or at least one nut and bolt. In some embodiments, trailer box 60 further comprises that the one or two hinged openings are/is secured when the hinged opening 66 is secured with a fastener comprising an L-shaped pin attached to the trailer box via a chain or similar means, and adjoining sleeves on the hinged opening 66 and a vertical frame section opposite the hinges 67. The front wall 64, back wall 71, bottom wall 65, top wall 63, are interconnected to form a hollow inner rectangular portion 13 (illustrated in FIGS. 1A and 2). It should be understood that the particular configuration of the trailer box 60 shown in FIG. 4 is intended for purposes of illustration only, and other variations of the trailer box could be employed within the scope of this invention.

The presently disclosed trailer boxes are not to be limited in scope by the specific embodiments described herein, which are intended as single illustrations of individual aspects of the presently disclosed trailer boxes, and functionally equivalent methods and components are within the scope of the presently disclosed trailer boxes. Indeed, various modifications of the presently disclosed trailer boxes, in addition to those shown and described herein will become apparent to those skilled in the art from the foregoing description and accompanying drawings. Such modifications are intended to fall within the scope of the appended claims.

What is claimed is:

1. A trailer box, comprising:
   a front wall, a back wall, a bottom wall, a top wall interconnected at 90 degree angles with a tubular metal frame comprising a plurality of structurally interconnected frame sections to form a hollow inner rectangular or trapezoidal portion and with opposed end portions comprising one or two hinged openings,
   wherein the plurality of structurally interconnected frame sections comprise four long horizontal frame sections, at least four vertical frame sections, and at least four horizontal frame sections providing a rectangular or trapezoidal frame,
   wherein the plurality of structurally interconnected frame sections comprise a metal selected from the group consisting of steel and aluminum,
   wherein the trailer box is mounted on an underside of a trailer to provide storage for hauling 4×4 posts and/or dunnage,
   wherein the one or two hinged openings comprise a rectangular metal frame covered with a sheet of solid metal, and
   wherein the sheet of solid metal of the one or two hinged openings further comprises cut outs and/or slits for viewing the contents of the trailer box.

2. The trailer box of claim 1, wherein the structurally interconnected frame sections are square or tubular metal structurally welded together.

3. The trailer box of claim 1, wherein the trailer box is structurally connected to an underside of a frame of a trailer with at least one weld, at least one nut and bolt and/or at least one metal strap held in place with a weld and/or at least one nut and bolt at each terminal end of the at least one metal strap.

4. The trailer box of claim 1, wherein the trailer box is structurally connected to an underside of a frame of a trailer with at least one ½ thick metal plate or ¾ thick metal plate welded to the trailer box and the trailer's frame and/or structurally connected with at least one nut and bolt.

5. The trailer box of claim 1, wherein the trailer box is mounted to the underside of the trailer parallel to a long frame rail of the trailer, wherein the one or two hinged openings being about perpendicular to the long frame rails of the trailer.

6. The trailer box of claim 1, wherein the trailer box is mounted to the underside of a trailer about perpendicular to at least one long frame rail of the trailer, wherein the one or two hinged openings being about parallel to the long frame rails of the trailer, and wherein the trailer is about 9' wide.

7. The trailer box of claim 1, wherein the trailer box is mounted to the underside of a trailer at between about 5 degrees to 45 degrees about the vertical axis of the trailer box relative to at least one long frame rail of the trailer, wherein the trailer box is a trapezoid mounted with the one or two hinged openings being about parallel to the long frame rails of the trailer, and wherein the trailer is about 8'6" wide.

8. The trailer box of claim 1, wherein the one or two hinged openings on opposed ends open with at least one hinge mounted to a horizontal frame section.

9. The trailer box of claim 1, wherein the one or two hinged openings on opposed ends open with at least one hinge mounted to a vertical frame section.

10. The trailer box of claim 1, wherein the back wall is a sheet of expanded metal.

11. The trailer box of claim 1, wherein the bottom wall is a sheet of expanded metal.

12. The trailer box of claim 1, wherein the top wall is a sheet of solid metal.

13. The trailer box of claim 1, wherein the front wall is a sheet of solid metal.

14. The trailer box of claim 1, wherein the front wall, the back wall, the bottom wall and the top wall are each a solid metal sheet.

15. The trailer box of claim 1, further comprising at least one metal frame support mounted to the front wall and/or a front wall frame section capable of interconnecting with and supporting at least one mud flap.

16. The trailer box of claim 1, wherein the sheet of solid metal is sized to cover the opposed end portions and is secured when closed with a fastener.

17. The trailer box of claim 16, further comprising that the one or two hinged openings are/is secured when closed with a fastener comprising at least one clasp, at least one sliding bolt, at least one strap or at least one nut and bolt.

18. The trailer box of claim 1, wherein the frame, front wall, back wall, bottom wall, and the top wall are constructed from steel or aluminum.

\* \* \* \* \*